United States Patent
Greenwood et al.

[15] 3,677,298
[45] July 18, 1972

[54] PILOT VALVE OPERATED MAIN VALVE WITH LOST MOTION CONNECTED AND TANDEM OPERATED VALVES

[72] Inventors: Roger Greenwood, Valencia; John P. Etcheverry, Sylmar, both of Calif.

[73] Assignee: International Telephone and Telegraph Corporation, New York, N.Y.

[22] Filed: Dec. 24, 1970

[21] Appl. No.: 101,330

[52] U.S. Cl. ........................................... 137/625.64, 251/30
[51] Int. Cl. ............................................... F16k 11/02
[58] Field of Search .......... 251/30, 139; 137/596.16, 625.64, 137/625.65

[56] References Cited

UNITED STATES PATENTS 3,318,332  5/1967  Lansky et al. ................... 137/625.64
3,303,854  2/1967  Churchill ........................ 137/625.65

Primary Examiner—Henry T. Klinksiek
Attorney—C. Cornell Remsen, Jr., Walter J. Baum, Paul W. Hemminger, Charles L. Johnson, Jr. and Thomas E. Kristofferson

[57] ABSTRACT

A solenoid actuated three-way valve to admit air under pressure to a spring biased piston in a cylinder and, alternatively, to exhaust the cylinder to the atmosphere. Two pilot valves are operated substantially in tandem. The operator has a lost motion connection with the valves for positive valve actuation in the event of pressure failure. A framework between one main valve and one pilot valve for the other main valve causes the one pilot valve to close when the one main valve opens, and vice versa. Both main valves are oriented so that fluid pressure biases them in a closing direction. Small closing bias springs and a small solenoid may thus be utilized. Good valve seating is thus obtainable. The overall size of the valve is also reduced.

8 Claims, 5 Drawing Figures

PATENTED JUL 18 1972
3,677,298
SHEET 1 OF 2
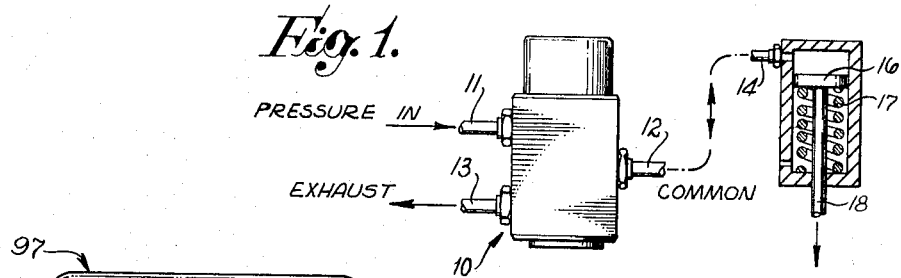
Fig. 1.
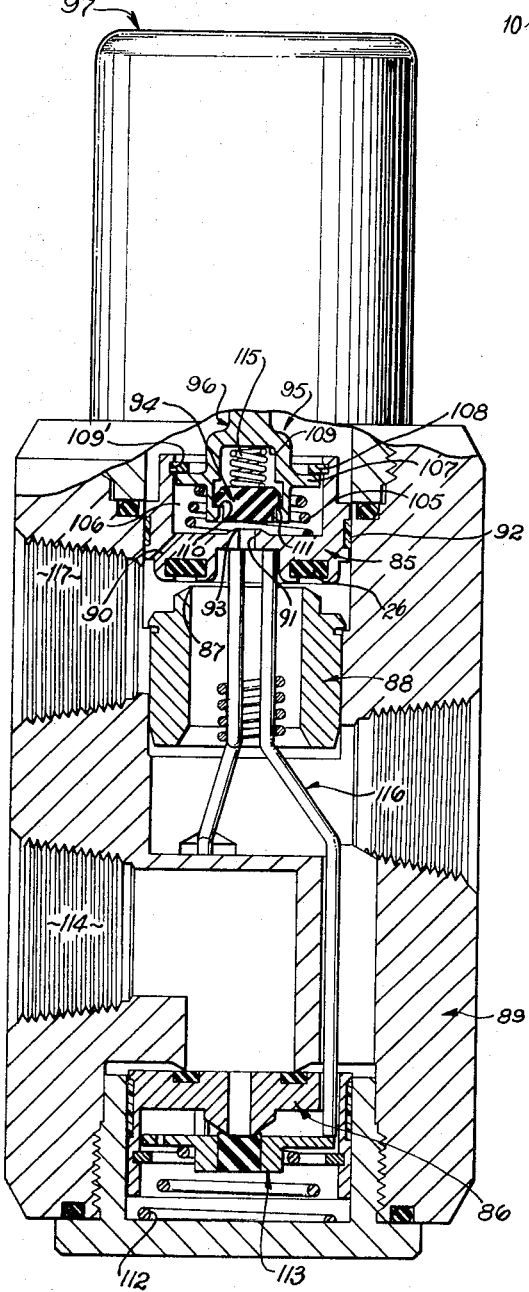
Fig. 5.
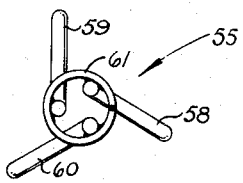
Fig. 3.
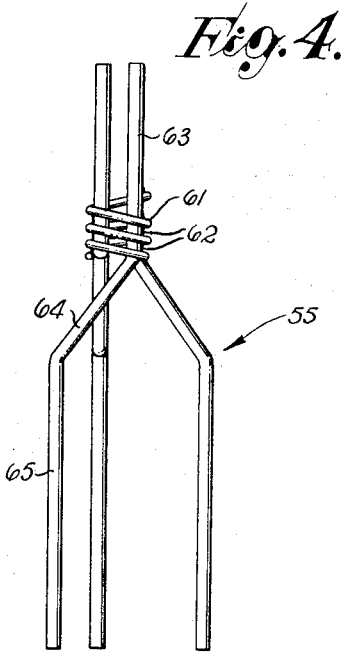
Fig. 4.
INVENTORS.
ROGER GREENWOOD
JOHN P. ETCHEVERRY
BY:
ATTORNEY.

INVENTORS
ROGER GREENWOOD
JOHN P. ETCHEVERRY
ATTORNEY 3,677,298

PILOT VALVE OPERATED MAIN VALVE WITH LOST MOTION CONNECTED AND TANDEM OPERATED VALVES

BACKGROUND OF THE INVENTION

This invention relates to the art of controlling the flow of a fluid, and more particularly, to a valve and components thereof.

The device of the present invention has been found especially useful in a solenoid operated three-way valve, but is not limited thereto or to any use set forth herein. For example, a valve connecting framework disclosed herein for operating two valves in tandem will be found useful in many other arts. Further, there are several features of the invention and any one feature may be used by itself or in combination with any one or more or all of the other features. For example, the invention may be used in a two-way valve.

In the past, a pilot operated valve has had no means to open or to close the main valve in the absence of pressure. However, this is often desirable for starting conditions.

It is also a disadvantage of prior art three-way valves that neither are pilot operated.

Another disadvantage of prior art three-way valves is that at least one valve has pressure on it tending to open it. This makes it necessary to use a large solenoid operator and/or a large bias spring for closing or opening. In either case, the size and cost of the valve is increased.

Prior art three-way valves operate two valves in tandem. However, the connection between them is large, expensive and interferes with fluid flow.

SUMMARY OF THE INVENTION

In accordance with the device of the present invention, the above-described and other disadvantages of the prior art are overcome by providing a pilot operated valve with a lost motion connection between the solenoid operator and the main valve. The solenoid thus can assist in valve operation in the absence of pressure.

In accordance with another feature of the invention, both valves in a three-way valve are pilot operated.

According to a further feature of the invention both valves of a three-way valve are oriented in a manner such that fluid pressure is always applied on the side of each valve in the closing direction. A small solenoid operator and/or bias or return spring may thus be employed. The valve is thus inexpensive and small in size.

A still further feature of the invention resides in the use of a small, inexpensive framework for connection between valves in a three-way valve. The framework is only a skeleton affair and thus does not impede fluid flow.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a side elevational view of a system for performing a mechanical operation;

FIG. 3 is a top plan view of a motion transmission framework shown in FIG. 2;

FIG. 4 is a side elevational view of the framework shown in FIG. 3; and

FIG. 5 is a vertical sectional view through a three-way valve illustrating an alternative embodiment of the present invention.

DESCRIPTION OF THE PREFERRED EMBODIMENTS

Figure 2:
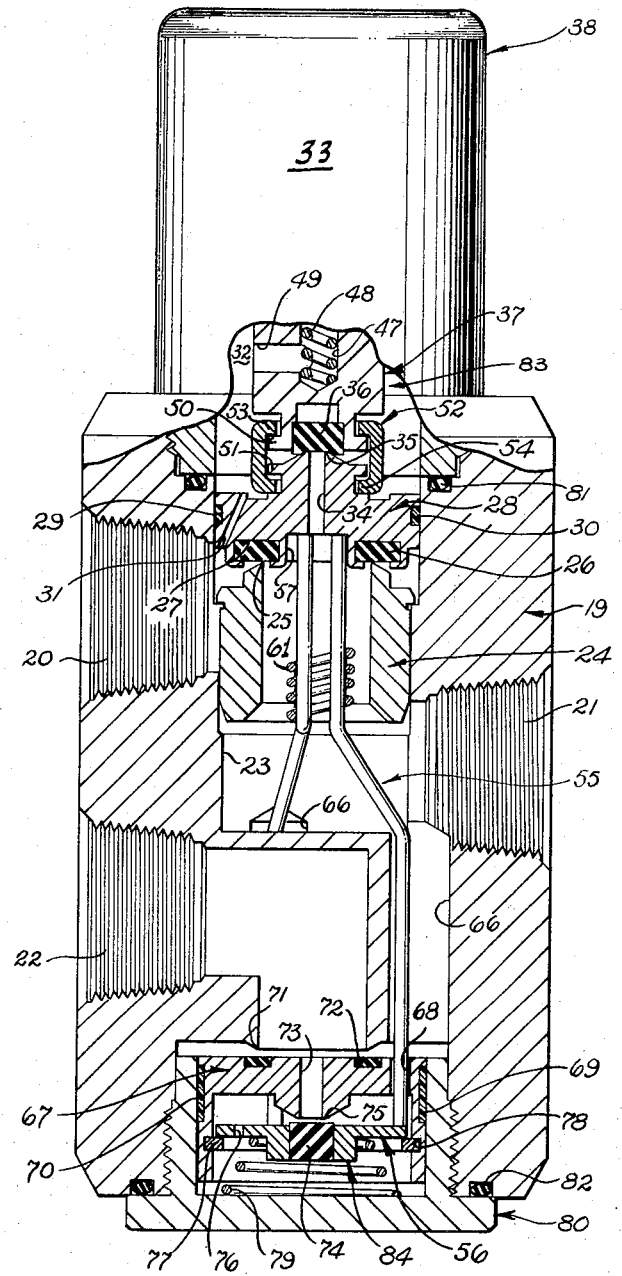
FIG. 2 is a vertical sectional view through a three-way valve constructed in accordance with the present invention.

In FIG. 1, one embodiment of the three-way valve of the present invention is indicated at 10 having a fluid inlet 11, a first fluid outlet 12 and a second fluid outlet 13.

Outlet 12 is connected to an inlet 14 of a cylinder 15. A piston 16 is movable up and down in the cylinder 15. A spring 17 biases piston 16 in a direction towards its upper position.

When a conventional three-way valve replaces valve 10, the system is entirely conventional. For example, a rod 18 is connected to piston 16 and may be employed to control the opening or closing of a much larger valve, or to perform any other mechanical function.

In accordance with the device of the present invention, fluid under pressure is supplied to valve 10 through inlet 11. Valve 10 has two positions. In one position, fluid is not allowed to enter through inlet 11, and the interior of cylinder 15 above piston 16 is vented to the atmosphere through outlet 13, for example, when the fluid is air.

In the other position, fluid is allowed to flow through inlet 11 and outwardly of outlet 12, outlet 13 then being shut off from outlet 12. The fluid then fills the space above piston 16 and drives it downwardly.

In the embodiment of FIG. 2, the present invention includes a valve body 19 having a pressure inlet port 20, a common outlet port 21 and an exhaust port 22.

Body 19 has a hollow cylindrical bore 23 in which a hollow cylindrical body 24 is swaged in a fluid tight manner. Body 24 provides a knife edge valve seat 25 on which a rubber ring 26 rests. Ring 26 is pressed into an annular cavity 27 in a main valve 28. Main valve 28 has an annular groove in its periphery at 29 in which a Teflon bearing seal 30 is located.

Main valve 28 has a passageway 31 to provide communication from the interior of port 20 to the interior 32 of the housing 33 of a magnetic solenoid operator 38.

Operator 38 may be entirely conventional and lift a member 37 when the solenoid, not shown, is energized.

Main valve 28 also has a passage therethrough at 34 which terminates in a valve seat 35 on which a rubber cylinder 36 rests. Cylinder 36 is fixed to hollow cylindrical member 37 which may form a portion of the solenoid plunger.

Cylinder 37 has a cylindrical bore 47 in which a spring 48 is located between the bottom of the bore to bias ring 26 and cylinder 36 against seats 25 and 35, respectively. Cylinder 37 also has a radial hole therethrough providing communication between bore 47 and the space 32 inside housing 33.

Hole 49 vents bore 47 to space 32.

Cylinder 37 has an outwardly extending annular flange 50. Main valve 28 has an annular adjacent flange 51. A cylinder 52 has upper and lower flanges 53 and 54, respectively, which limit movement of cylinder 37 and main valve 28 apart.

A framework 55 also shown in FIG. 3 and FIG. 4, is positioned between main valve 28 and a plate 56 in FIG. 2. On its lower side, main valve 28 has a cylindrical recess 57. Framework 55 includes three identical pins 58, 59 and 60 at which a helical open coiled spring 61 is soldered at 62.

As shown in FIG. 4, each pin has an upper portion 63, an intermediate portion 64 and a lower portion 65. All of the portions 63, 64 and 65 of any one pin lie approximately in the same plane tangent to the internal surface of the helix 61, as shown in FIG. 1.

All of the portions 63, 64 and 65 are straight although they are connected by joints. All of the portions 63, 64 and 65 are thus integral with one another. Portions 63, 64 and 65 are all parallel to one another. All of the portions 63, 64 and 65 are parallel to the symmetrical axis of bore 23.

In FIG. 2, upper portions 63 are all approximately tangent to the cylindrical surface of recess 57.

Body 19 has three cylindrical drilled holes 66 through which the three respective pin portions 65 extend.

A main valve 67 has three holes 68 therethrough through which the lower pin portions 65 project, respectively. Thus, all of the lower ends of all of the three lower pin portions 65 engage plate 56.

As before, main valve 67 has an outer annular groove 69 in which a Teflon bearing seal 70 is located. Body 19 provides a knife edge valve seat at 71. A rubber ring 72 is fixed to main valve 67 to rest on valve seat 71.

A clearance is provided between the lower portions 65 of pins 58, 59 and 60 and the internal surfaces of holes 68. One of the functions that these clearances provided is the same as that of hole 31 in main valve 28.

Main valve 67 has a central hole 73 therethrough similar to the central hole 34 through main valve 28.

A rubber cylinder 74 is fixed to plate 56. A valve seat 75 is formed at the end of hole 73. Cylinder 74 thus rests on valve seat 75.

A hole 76 is provided through plate 56.

Downward movement of plate 56 is limited by a snap ring 77 which is located in an internal groove 78 in main valve 67.

An open coil conical spring 79 is positioned between an end cap 80 and plate 56 to bias plate 56 upwardly, as viewed in FIG. 2.

At the upper end of body 19, an O-ring 81 provides a fluid tight seal between body 19 and housing 33.

At the lower end of the three-way valve, shown in FIG. 2, an O-ring 82 provides a fluid tight seal between body 19 and end cap 80.

The three-way valve of FIG. 2 is called a normally closed valve because fluid under pressure in port 20 cannot reach port 21 because main valve 28 is normally closed.

Note will be taken that rubber ring 26 may be defined as a portion of main valve 28. Similarly, rubber cylinder 36 may be defined as a portion of a pilot valve including cylinder 37. Again, rubber ring 72 may be defined as a portion of main valve 67. Rubber cylinder 74 may be defined as a portion of pilot valve including plate 56.

For reference purposes, the upper pilot valve is indicated at 83, and the lower pilot valve is indicated at 84.

In the operation of the three-way valve of FIG. 2, it is important to note that the upper and lower flanges 53 and 54, respectively, of cylinder 52 are spaced apart a distance sufficient that pilot valve 83 can be held fully open before lower flange 54 of cylinder 52 engages the lower surface of main valve flange 51.

It is also important to note that passage 31 is smaller than passage 34 and that passage 34, therefore, can pass fluid at a rate greater than that at which passage 31 can pass fluid.

Similarly, the cavity of holes 68 in main valve 67 can pass fluid therethrough between the internal surfaces thereof and the external surfaces of lower pin portions 65 are small in comparison to the cavity of passage 73 to pass fluid when pilot valve 84 is fully open.

OPERATION OF THE EMBODIMENT OF FIG. 2

In the embodiment of FIG. 2, in the positions shown, main valve 28 seals with seat 25 and no fluid under pressure in port 20 can exit through port 21. Spring 48 maintains pilot valve 83 closed, and fluid thus can pass through passage 31 and the absence of pressure inside body 24 causes a differential pressure to close and maintain main valve 28 closed. Moreover, pilot valve 83 is maintained closed not only by spring 48, but also by the differential pressure. It is an outstanding advantage of the present invention that both pilot valves and both main valves are maintained closed in their closed positions by a differential pressure.

When main valve 28 is closed, main valve 67 is always open, and vice versa. This is true because, in the closed position, main valve 28 presses framework 55 downwardly and opens pilot valve 84 by depressing plate 56 against the force of spring 79. Further, a differential pressure maintains main valve 67 open. This is true because the cavity of holes 68 is smaller than the cavity of hole 73, and a pressure differential is created across main valve 67 which holds it open.

When solenoid operator 38 is energized, cylinder 37 is pulled upwardly against the action of spring 48. Pilot valve 83 is then open, and the pressure in space 32 is bled off rapidly through passage 34, and the pressure of fluid in port 20 then opens main valve 28. At the same time, spring 79 returns pilot valve 84 to its closed position, and the previously explained differential pressure closes main valve 67.

Should there be no pressure in port 20, main valve 28 may, nevertheless, be open because the lower flange 54 of cylinder 52 will pick up the main valve flange 51 after pilot valve 83 has been fully opened.

ALTERNATIVE EMBODIMENT OF FIG. 5

The main difference between the embodiment of FIG. 2 and the embodiment of FIG. 5 is that an upper main valve 85 is normally open, and a lower main valve 86 is normally closed.

All of the structure shown in FIG. 5 below a valve seat 87 of a body 88 inside of valve body 89 is identical to that shown below valve seat 25 of body 24 in FIG. 2.

Main valve 85 has passages 90 and 91 therethrough of the same diameters as those of passages 31 and 34, respectively, of main valve 28 in FIG. 2. Main valve 85 also has a Teflon bearing seal 92.

Main valve passage 91 terminates in a pilot valve seat 93. A rubber cylinder 94 rests on valve seat 93.

Main valve 85 has a pilot valve 95 including cylinder 94 and a plunger 96.

A solenoid operator 97 is provided in a magnetic housing 98. As before, operator 97 may be entirely conventional and, when energized, may move plunger 96 down to close pilot valve 95 and main valve 85.

Plunger 96 is biased into the position shown by a helically coiled spring 105 which fits between the upper side of main valve 85 in a recess 106. Plunger 96 has a flange 107 which is engaged by spring 105, and which, in turn, engages a snap ring 108 that fits in a groove 109 in recess 106.

Plunger 96 has an upwardly extending recess 109 that has an inwardly extending shoulder 110 at its lower end.

Cylinder 94 has a shoulder 111 that engages shoulder 110.

OPERATION OF THE EMBODIMENT OF FIG. 5

In the embodiment of FIG. 5, main valve 85 is normally open and main valve 86 is normally closed.

As before, pressure above main valve 85 is bled off through passage 91, and a differential pressure across main valve 85 helps to keep it open. A spring 112 biases the lower pilot valve 113 closed. However, since the pressure below pilot valve 113 and main valve 86 is high compared to that in exhaust port 114, the same pressure which keeps main valve 85 open, also keeps main valve 86 closed. The same is true of the pilot valves 95 and 113.

When solenoid operator 97 is energized, plunger 96 is pushed downwardly against the force of spring 105. Cylinder 94 then rests and seals valve seat 93. A spring 115 takes up any overtravel of plunger 96. Pressure then builds up inside housing 98 above main valve 85, and the differential pressure across main valve 85 closes it and keeps it closed as well as it keeps pilot valve 95 closed.

Downward movement of main valve 85 then causes pilot valve 113 to open through the motion thereof imparted to framework 116. The differential pressure across main valve 86 then opens it.

In the absence of pressure in port 117, the extreme lower end of plunger 96 abuts the upper surface of main valve 85 inside recess 106, and forces main valve 85 closed.

From the foregoing, it will be appreciated that both the lost motion connection between pilot valve 83 and main valve 28, shown in FIG. 2, by cylinder 52 and the lowest lost motion connection between plunger 96 and main valve 85 in FIG. 5 makes it possible to utilize the benefits of two pilot operated valves in a three-way valve, and, at the same time, make it possible to open or close main valves 28 and 85 even in the absence of pressure. As stated previously, this can be advantageous, for example, under starting conditions.

It is also an advantage of the present invention that all of the main valves 28, 67, 85 and 86 are pilot operated to accommodate multiple changing functions at high pressures with very little solenoid power.

Still another advantage of the present invention resides in the use of all four of the main and pilot valves shown in FIG. 5, which are pressure actuated. That is, pressure tends both to open and to close all of the pilot valves 83, 84, 95 and 113. The same is true of main valves 28, 67, 85 and 86. For this reason, the elimination of a large solenoid operator is made possible. Further, for this same reason, bias springs 48, 79, 115, 105 and 112 may be all relatively small. Further, the use of small bias springs makes it possible to use an unusually small solenoid.

Still a further feature of the invention resides in the use of assembly 55 which transfers motion of main valves 28 and 85 to pilot valves 84 and 113, respectively. Note will be taken that assembly 55 may be easily manufactured and assembled, and will not impede fluid flow. Moreover, pins 58, 59 and 60 may be easily jigged for soldering in the position shown in FIG. 3 by locating upper portion 63 in a jig recess substantially identical to recess 57 in main valve 28. It has been found especially useful to jig pins 58, 59 and 60 in the positions shown in FIG. 3 because in these positions, with the planes thereof tangent to the inside of the helix, the finished construction of framework 55 is less sensitive to any inaccuracies in the bends of pins 58, 59 and 60. Note in FIG. 3 that the axis of each of the upper portions 63 of the pins 58, 59 and 60 lie at the apexes of an equilateral triangle in a plane perpendicular to the axes. The same is true of the axes of lower portions 65 of the pins 58, 59 and 60.

What is claimed is:

1. A fluid flow control device comprising: a body having inlet and outlet ports; a main valve seat fixed in said body; a main valve guided for movement on said body from a position spaced from said main seat to a position in sealing engagement therewith, and vice versa, and main seat having a passage therethrough to provide free and open communication between said ports when said main valve is open, said main valve having first and second openings therethrough, said main valve having a pilot valve seat around one end of said first opening; a pilot valve guided for movement on said body to open and to close said pilot seat opening; means to provide a fluid tight enclosure on one side of said main valve, said first opening providing free and open communication from the interior of said enclosure to said outlet port when said pilot valve is open, said second opening providing communication between said inlet port and the interior of said enclosure, said first opening being larger than said second opening; a plunger guided for movement on said body; means connecting said pilot valve to said plunger, a preponderance pressure tending to open said main valve when said pilot valve is open, a preponderance of pressure tending to close said main valve when said pilot valve is closed; means to move said plunger toward and away from said pilot seat; and a lost motion connection between said plunger and said main valve to permit plunger actuation of said pilot valve and to assist in movement of said main valve in the event of pressure failure.

2. The invention as defined in claim 1, including means to bias said main valve to its closed position, said plunger and said main valve having outwardly extending annular, radial flanges at their lower and upper ends, respectively, and a cylinder extending around said flanges, said cylinder having an upper annular flange extending radially inwardly over the top of said plunger flange and a lower annular flange extending radially inwardly under said main valve flange, the distance between the facing surfaces of said cylinder flanges being at least as large as the distance between the outer surfaces of said plunger and main valve flanges when said pilot valve is fully open.

3. The invention as defined in claim 1, including means to bias said main valve to its open position, a first spring mounted on said body to bias said main valve open, said main valve having an upper hollow cylindrical extension around said first opening, said plunger having an annular flange to slide inside said extension, an internal groove in said extension, a snap ring in said groove to prevent said plunger flange from sliding out of said extension, a second spring in compression inside said extension between said main valve and said plunger engages said snap ring, said plunger having a re-entrant cylindrical cavity at its lower end, said cavity having an inwardly extending annular shoulder at its lower end, said pilot valve being cylindrical and located in said cavity with its lower end projecting outwardly thereof, said pilot valve having a shoulder to mate with and rest on said cavity shoulder, and a third spring in compression in said cavity between said plunger and said pilot valve when said shoulders lie in engagement with each other.

4. A motion transmission assembly comprising: a body having an approximately cylindrical recess therein; three pins; means to hold said pins in fixed positions relative to each other, said three pins having one set of upper portions located axially inside said recess contiguous to the cylindrical surface thereof, said pins having bent portions so as to lie out of straight alignment with said upper portions thereof, all portions of each pin lying within a single corresponding plane located approximately tangent to the cylindrical surface of said recess.

5. The invention as defined in claim 4, wherein said upper portions of said pins are axially straight and parallel and angularly spaced about the the axis of said recess, the angular spacing between each adjacent pair of said upper portions being 120°, all of said pins being substantially identical, each pin having a straight intermediate portion extending radially outward and axially away from said upper portions, each pin having a straight lower portion extending axially away from each corresponding intermediate portion.

6. A fluid flow control device comprising: a valve body having pressure and exhaust ports; a first main valve mounted in said body to connect the pressure and common ports; a second main valve mounted in said body, said body having a port common to both of said main valves, said second main valve being mounted in a position connecting said common and exhaust ports; first and second pilot valves mounted in said body to cause the pressure of fluid in said body to open and to close said first and second main valves, respectively; means to operate said first pilot valve to cause it to open and to close; means mounted between one of said first valves and said second pilot valve to cause said second pilot valve to open when said one valve is in one position and to cause said second pilot valve to close when said one valve is in another position, different from said one position, said body including oppositely facing first and second main valve seats, said first and second main valves being movable selectively to rest on said first and second seats, respectively, a spring mounted in compression between said body and said second pilot valve when it is in its closed position, and a framework in compression between said one valve and said second pilot valve to cause said second pilot valve to open when said one valve closes and to cause said second pilot valve to close when said one valve opens.

7. The invention as defined in claim 6, wherein said one valve is said first main valve.

8. A fluid flow control device comprising: a valve body having a longitudinal bore and first and second valve seats surrounding said bore at each end thereof; first and second valves guided on said body to rest on said first and second seats, respectively; rigid operator means between said valves to cause one valve to open when the other is closed, and vice versa; said operator means including three pins, stabilizer means to hold said pins in fixed positions relative to each other; a third valve positioned between said second valve and said second seat, said first valve having a cylindrical, axial recess in the center thereof on the side thereof facing said third valve, the upper ends of said pins extending axially into said recess, all of said pins being located contiguous to the cylindrical surface of said recess 120° apart, said pins having intermediate portions of equal lengths bent outwardly and downwardly, the lower portions of said pins extending straight downwardly at a radius larger than that of said recess, said lower portions being angularly spaced 120° apart, said third valve having three holes therethrough, said lower pin portions projecting through said holes into contact with said second valve, all portions of each said pin lying in a single axial plane approximately tangent to the cylindrical surface of said recess.

* * * * *